United States Patent [19]

Lal Kaul

[11] 3,896,113

[45] July 22, 1975

[54] NOVEL METALLIZED HETEROCYCLIC DERIVATIVES

[75] Inventor: Bansi Lal Kaul, Basel, Switzerland

[73] Assignee: Sandoz Ltd., Basel, Switzerland

[22] Filed: Dec. 22, 1972

[21] Appl. No.: 317,518

[30] Foreign Application Priority Data
Dec. 31, 1971 Switzerland.................... 19258/71
Jan. 28, 1972 Switzerland...................... 1317/72

[52] U.S. Cl. ..................... 260/240 G; 8/7; 8/62; 106/23; 106/288 Q; 117/38; 162/162; 260/39 M
[51] Int. Cl............................................. C07d 51/02
[58] Field of Search............. 260/250 Q, 240 G, 242

[56] References Cited

UNITED STATES PATENTS

| | | | |
|---|---|---|---|
| 2,993,065 | 7/1961 | Kumins et al. | 260/439 |
| 3,326,915 | 6/1967 | Jackson et al. | 260/250 Q |
| 3,484,387 | 12/1969 | Jackson et al. | 260/2 |

FOREIGN PATENTS OR APPLICATIONS

| | | | |
|---|---|---|---|
| 1,416,293 | 9/1965 | France | 260/439 |
| 2,078,761 | 11/1971 | France | 260/439 |

*Primary Examiner*—John D. Randolph
*Attorney, Agent, or Firm*—Gerald D. Sharkin; Richard E. Vila; Joseph J. Borovian

[57] ABSTRACT

The invention provides novel metal containing heterocyclic compounds useful as pigments.

18 Claims, No Drawings

NOVEL METALLIZED HETEROCYCLIC DERIVATIVES

This invention relates to metal containing heterocyclic compounds which are free from water-solubilising groups.

More particularly, this invention provides compounds of formula I,

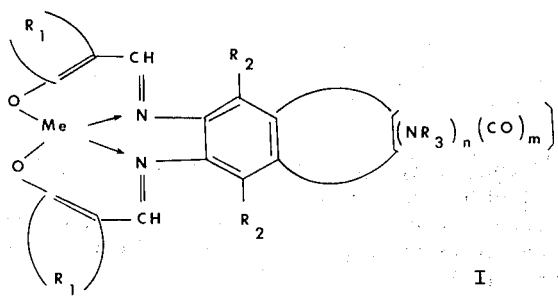

in which the radicals $R_1$, which may be the same or different, together with the carbon atoms to which they are attached, signify a carbocyclic or heterocyclic ring of aromatic character, the radicals $R_2$, which may be the same or different, each signify a hydrogen atom or a substituent, $R_3$ signifies a hydrogen atom or an alkyl or phenyl radical which may be substituted, Me signifies a divalent metal atom, $m$ signifies 1 or 2, and n signifies 1 or 2 provided that the sum of $n$ and $m$ is at least 3 and that the compounds contain no carboxylic or sulphonic acid groups.

When $R_1$, together with the carbon atoms to which it is attached, signifies an aromatic carbocyclic ring, it preferably signifies 1,2-phenylene, or 1,2 or 2,3-naphthalene. When $R_1$ together with the carbon atoms to which it is attached signifies a heterocyclic ring of aromatic character, such, for example, contains one or two oxygen, nitrogen or sulphur atoms. These aromatic rings may for example bear 1, 2, 3 or 4 substituents. Suitable substituents include halogen, in particular chlorine or bromine, alkyl of 1 to 8, preferably 1 to 4 carbon atoms, trifluoromethyl, alkoxy of 1 to 8, preferably 1 to 4 carbon atoms, cyano, nitro, hydroxylamino, alkylamino or dialkylamino in which the alkyl group (s) contain 1 to 8, preferably 1 to 4 carbon atoms, or acyl. Preferred acyl groups are of formula R—Y or R'—Z, in which R signifies a hydrocarbon radical which may be substituted, for example by any of the above mentioned substituents and may contain hetero atoms, e.g. oxygen, nitrogen or sulphur atoms, but is preferably an alkyl radical of 1 to 8, preferably 1 to 4 carbon atoms, or the phenyl radical, Y signifies —O—CO—, —SO$_2$— or —O—SO$_2$—, R' signifies hydrogen or R, Z signifies —CO, —NR''—CO or —NR''SO$_2$—, in which R'' signifies hydrogen or R. Preferred acyl radicals include alkoxycarbonyl and alkanoyl radicals of 2 to 5 carbon atoms, alkylsulphonyl or alkoxysulphonyl radicals of 1 to 4 carbon atoms, phenylsulphonyl, benzoyl, phenoxycarbonyl, phenoxysulphonyl and alkylaminocarbonyl and dialkylaminocarbonyl, in which the alkyl radical(s) contain 1 to 4 carbon atoms.

Particularly, preferred heterocyclic radicals for $R_1$, together with the carbon atom to which it is attached, include those of formula IV,

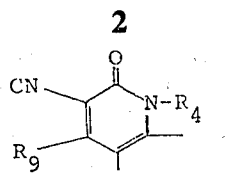

in which $R_4$ signifies hydrogen or an alkyl radical of 1 to 8 carbon atoms or a phenyl radical which may be substituted, and $R_9$ signifies an alkyl radical of 1 to 8 carbon atoms.

$R_1$, together with the carbon atoms to which it is attached, more preferably signifies a radical of formula II, III or IVa,

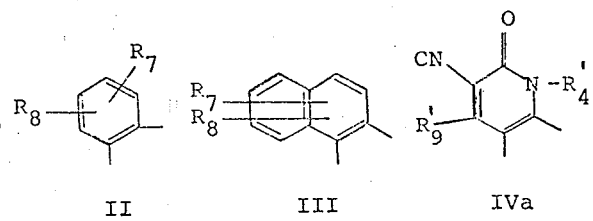

in which $R_7$ and $R_8$, which may be the same or different, each signifies a hydrogen or halogen atom, or an alkyl or alkoxy radical of 1 to 4 carbon atoms, $R_4'$ signifies a hydrogen atom, an alkyl radical of 1 to 4 carbon atoms, or the phenyl radical, and $R_9'$ signifies an alkyl radical of 1 to 4 carbon atoms.

Suitable significances for $R_2$ include hydrogen and those substituents mentioned above for the ring formed by $R_1$. Suitably, each $R_2$ signifies hydrogen or halogen, particularly chlorine or bromine or an alkyl or alkoxy radical of 1 to 4 carbon atoms. More preferably each $R_2$ signifies a hydrogen atom.

Me suitably signifies a divalent metal atom such as chromium, manganese, iron, copper, zinc, nickel or cobalt, preferably copper, zinc, nickel or cobalt.

The formula $>[(NR_3)_n(CO)_m]$ suitably signifies the following radicals

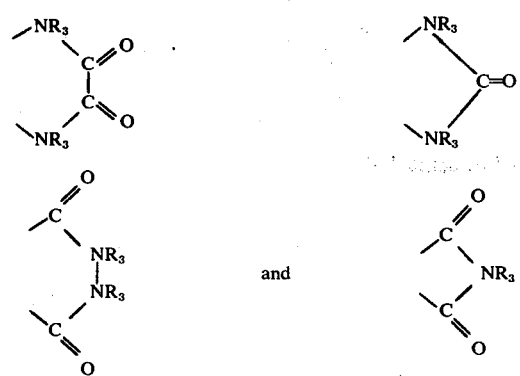

When $R_3$ signifies an alkyl radical, it preferably contains 1 to 8, more preferably 1 to 4 carbon atoms. Suitable substituents on such alkyl radicals, and on any other alkyl radicals present in the molecule include halogen, in particular chorine or bromine, cyano, alkoxy of 1 to 8, preferably 1 to 4 carbon atoms, phenyl, phenoxy, acyl, acyloxy and acylamino. Suitable such acyl radicals are those mentioned above. When $R_3$ signifies phenyl it may suitably bear as substituents any of those mentioned above in connection with $R_1$. Preferably, however, $R_3$ signifies hydrogen, unsubstituted alkyl of 1 to 4 carbon atoms or phenyl, more preferably hydrogen.

The preferred compounds of formula I are those of formula Ia,

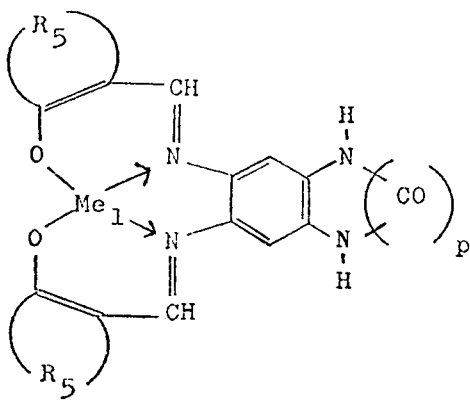

in which $R_5$ signifies a radical of formula V,

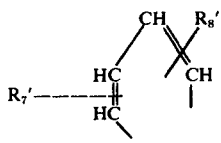

in which $R_7'$ and $R_8'$, which may be the same or different, each signifies hydrogen, chlorine or methoxy,
of formula VI,

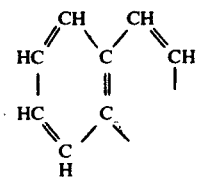

or of formula VII,

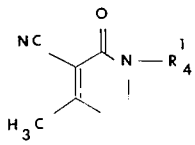

in which $R_4'$ is as defined above, Me signifies nickel, cobalt, copper or zinc,
and $p$ signifies 1 or 2.

The invention also provides a process for the production of compounds of formula I, characterised by metallising a compound of formula X,

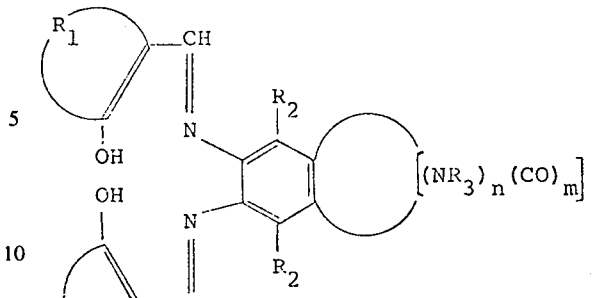

in which R, $R_2$, $R_3$, $n$ and $m$ are as defined above, with a salt of the divalent metal Me.

The compounds of formula X are novel and may be produced by reacting a compound or compounds of formula VIII,

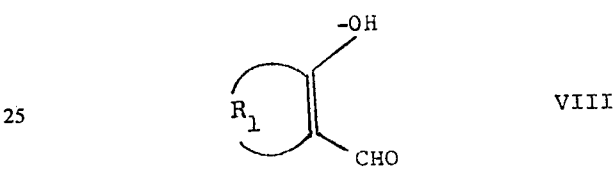

in which $R_1$ is as defined above, with a compound of formula IX,

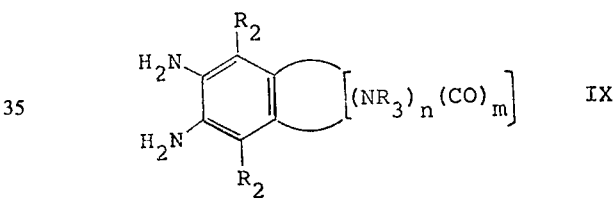

in which $R_2$, $R_3$, $n$ and $m$ are as defined above, or an acid addition salt thereof.

As will be appreciated, where the radicals $R_1$ in the desired final product or compound X differ, then a mixture of compounds of formula VIII is employed.

As will also be appreciated, the metallisation of the compounds of formula X may be effected simultaneously with or subsequent to the reaction of the compound(s) VIII and the compound IX.

The condensation of the compound(s) VIII and compound IX is suitably effected in an aqueous medium or in an organic solvent which is miscible with water, e.g. an alkanol of 1 to 4 carbon atoms, dimethyl formamide, dimethyl acetamide, a glycol or glycol ether, dioxane or N-methylpyrrolidone. Suitably, the condensation is effected at a temperature of from room temperature to about 250°C, preferably 30° to 150°C. Suitable salts of the compound of formula IX include the hydrochloride or sulphate. As indicated, the reaction with the divalent metal salt may be effected simultaneously with the condensation. Alternatively, it may be effected subsequently in conventional manner. Suitable salts of the divalent metal include the chloride, formate and acetate.

The resulting compounds of formula I may be isolated and purified using conventional techniques.

The compounds of the invention are useful as pigments, particularly after conditioning by the normal methods for pigments. They are thus suitable for the pigmentation of synthetic polymeric materials in the mass. By this is understood, synthetic polymers and resins containing or free from solvents, including surface coatings on an oil or water basis, lacquers and enamels of various compositions and spinning solutions. The pigments are particularly applicable to viscose rayon and cellulose acetate, polyethylene, polystyrene, polyvinyl chloride, rubber and poromerics (synthetic leather). The pigments are also suitable for use in printing inks, for dyeing paper in the stock, and for pigment printing or coating of textiles.

Standard methods of application of the pigments may be employed.

The compounds of formula X also have the pigmentary properties described above but, in general, these are somewhat less satisfactory than those possessed by the metallised compounds I.

The pigments of formula I possess noteworthy transparency, heat resistance, stability to migration and fastness to light, weathering, overspraying and solvents.

In the following Examples, parts are by weight and temperatures in °C.

EXAMPLE 1

A solution of 34.4 parts of 2-hydroxy-1-naphthaldehyde and 30 parts of 6,7-diamino-2,3-dihydroxyquinoxaline-dihydrochloride dihydrate in 3000 parts of dimethyl formamide is reacted for 2 hours at 140°C with stirring. A solution of 12 parts of nickel chloride in 1000 parts of dimethyl formamide are added, after which the temperature is maintained at 140°C for a further 2 hours with stirring. On cooling, yellowish red crystals settle out. The crystals are isolated by filtration, washed with dimethyl formamide and then with water, and dried, which frees the product from impurities and solvent. The pigment of formula

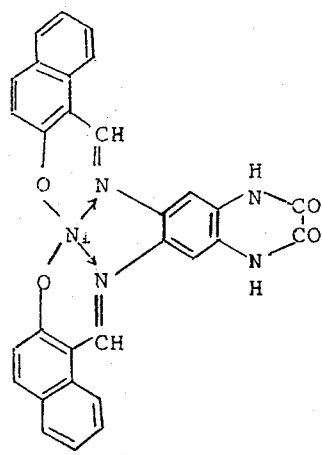

thus obtained (via the corresponding intermediate X), pigments polyvinyl chloride in yellowish red shades with satisfactory fastness properties.

EXAMPLE 2

A solution of 47.4 parts of 5,6-diamino-2-(3H)-benzimidazolone dihydrochloride in 400 parts of water is gradually combined over 30 minutes with a solution of 68.8 parts of 2-hydroxyl-1-naphthaldehyde in 1000 parts of 2-methoxyethanol, at room temperature, with stirring. Stirring is continued for 1 hour at room temperature, and the solution is reacted further for 1 hour at 60° to 70° with continued stirring. The crystalline orange product of formula

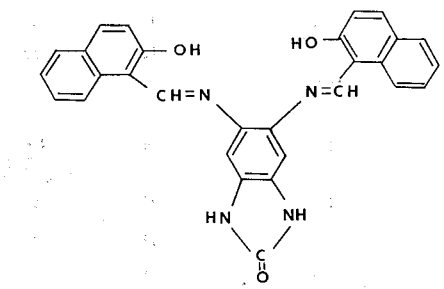

is filtered at room temperature, washed with methanol and dried.

47.2 parts of this compound are suspended in 1500 parts of dimethyl formamide. A solution of 12 parts of nickel chloride in 1500 parts of dimethyl formamide is stirred into the suspension and the metallising reaction carried out for 2 hours at 125°, with stirring. On cooling to room temperature, the orange-red crystalline precipitate is filtered, washed with dimethyl formamide and then with water, and dried. The pigment thus formed which is the nickel derivative of the above compound pigments polyvinyl chloride in intense orange shades which show satisfactory fastness properties.

The same pigment can be produced as follows. A mixture of 24.6 parts of 5,6 diamino-2-(3H)-benzimidazolone and 51.6 parts of 2-hydroxy-1-naphthaldehyde in 750 parts of dimethyl formamide is reacted for 1 hour at 23° and then for 1 hour at 60° with constant stirring. A clear solution of orange colour is formed which is cooled to 25° and set with 35.5 parts of nickel chloride hexahydrate, added with continued stirring. The reaction mixture is raised to 125° and held at this temperature for 2 hours with stirring. The orange-red pigment is filtered from the hot medium, washed with dimethyl formamide, then with water and finally with ethanol, and dried.

The pigments specified in the table below may be produced in analogy with the procedures of Example 1 or 2 and are identified in the table by the significance of the symbols in formula I and by their shades in polyvinyl chloride.

TABLE

| Example Nr. | R₁ | R₂ | $[(NR_3)_n(CO)_m]$ | Me | Shade in Polyvinyl chloride |
|---|---|---|---|---|---|
| 3 |  | H | 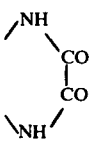 | Ni | yellow-orange |
| 4 | do. | H | do. | Co | brown |
| 5 |  | H | do. | Ni | brown |
| 6 | do. | H | do. | Cu | yellow |
| 7 |  | H | do. | Cu | orange |
| 8 | do. | H |  | Zn | yellow-orange |
| 9 | do. | H | do. | Cu | brown-orange |
| 10 |  | H | do. | Cu | brown-gelb |
| 11 | do. | H | do. | Co | yellow-orange |
| 12 |  | H |  | Zn | yellow |
| 13 |  | H | do. | Cu | yellow |
| 14 |  | H | do. | Ni | orange |
| 15 | do. | H | do. | Zn | yellow |
| 16 |  | H | do. | Cu | yellow-orange |
| 17 | do. | H | do. | Ni | orange |
| 18 | do. | H | do. | Zn | yellow |
| 19 |  | H | do. | Zn | do. |
| 20 |  | H | do. | Ni | red-orange |
| 21 |  | H | do. | Zn | do. |
| 22 | 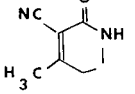 | H | do. | Cu | brown-orange |

APPLICATION EXAMPLE 0.2 parts of the pigment obtained according to Example 1 and 5 parts of titanium dioxide are added to a starting mixture of 63 parts of polyvinyl chloride emulsion, 32 parts of dioctyl phthalate, 3 parts of a commercial epoxy softener, 1.5 parts of a commercial stabiliser (a barium-cadmium complex) and 0.5 parts of a commercial chelator with stirring for intimate mixing. The mixture is worked on a roller mill between two rolls heated to 160° and set to rotate at 20 and 25 r.p.m. respectively to exert frictional force for improved pigment distribution. The mixture is extruded as film of 0.3 mm thickness, which is pigmented in a yellowish red shade showing satisfactory light and migration fastness and heat stability.

Similar results may be obtained with the pigments of any of the other foregoing Examples.

What is claimed is:

1. A compound of formula

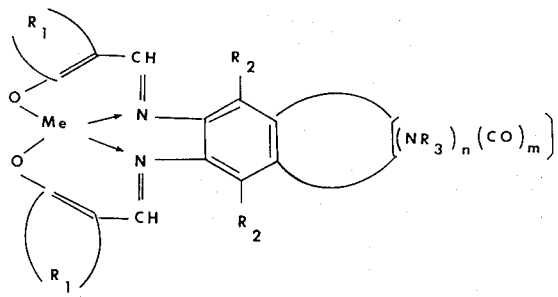

in which the radicals $R_1$, which may be the same or different, together with the carbon atoms to which they are attached, each signifies an unsubstituted or mono-, di-, tri- or tetra-substituted carbocyclic radical selected from the group consisting of 1,2-phenylene, 1,2-naphthalene and 2,3-napthalene, or a heterocyclic radical of the formula

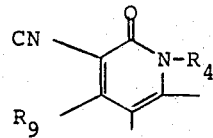

in which $R_4$ signifies hydrogen or an alkyl radical of 1 to 8 carbon atoms or a phenyl radical and $R_9$ signifies an alkyl radical of 1 to 8 carbon atoms, each $R_2$ is hydrogen, halogen or alkyl or alkoxy of 1 to 4 carbon atoms, $>[(NR_3)_n(CO)_m]$ signifies a radical selected from

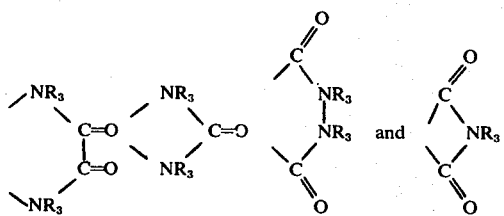

$R_3$ signifies hydrogen, an alkyl radical of 1 to 8 carbon atoms, which is unsubstituted or substituted by halogen, cyano, alkoxy of 1 to 8 carbon atoms, phenyl, phenoxy, acyl, acylamino or acyloxy, or a phenyl radical which is unsubstituted or mono-, di- or tri-substituted, Me signifies chromium, manganese, iron, copper, zinc, nickel or cobalt, $m$ signifies 1 or 2, and $n$ signifies 1 or 2, provided that the sum of $n$ and $m$ is at least 3 and that the compounds contain no carboxylic or sulphonic acid groups, and further provided that any substituent on a carbocyclic significance of $R_1$ or on the phenyl significance of $R_3$ is selected from the group consisting of halogen, alkyl or alkoxy of 1 to 8 carbon atoms, trifluoromethyl, cyano, nitro, hydroxylamine, alkylamino or dialkylamino in which the alkyl radical(s) contain 1 to 8 carbon atoms, and acyl, and further provided that any acyl radical is selected from the group consisting of alkoxycarbonyl and alkanoyl in which the alkyl radical contains 1 to 4 carbon atoms, alkylsulphonyl or alkoxysulphonyl of 1 to 4 carbon atoms, phenylsulphonyl, benzoyl, phenoxycarbonyl, phenoxysulphonyl and alkylaminocarbonyl and dialkylaminocarbonyl in which the alkyl radical(s) contain 1 to 4 carbon atoms.

2. A compound of claim 1, in which the radicals $R_1$ are the same.

3. A compound of claim 1, in which the substituents are selected from chlorine, bromine, alkyl or alkoxy of 1 to 4 carbon atoms, trifluoromethyl, cyano, nitro, hydroxylamino, alkyl or dialkylamino, in which the alkyl radical(s) contain 1 to 4 carbon atoms, oxo, alkoxycarbonyl and alkanoyl in which the alkyl radical contains 1 to 4 carbon atoms, alkylsulphonyl or alkoxysulphonyl of 1 to 4 carbon atoms, phenylsulphonyl, benzoyl, phenoxycarbonyl, phenoxysulphonyl and alkylaminocarbonyl and dialkylaminocarbonyl in which the alkyl radical(s) contain 1 to 4 carbon atoms.

4. A compound of claim 1, in which the radicals $R_1$, together with the carbon atoms to which they are attached, each signify a radical of formula II, III or IVa,

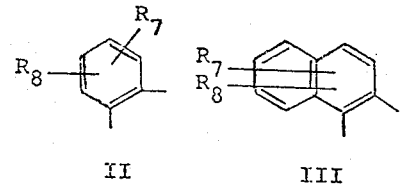

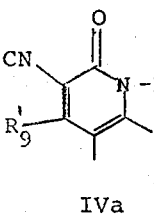

IVa in which $R_7$ and $R_8$, which may be the same or different, each signifies a hydrogen or halogen atom, or an alkyl or alkoxy radical of 1 to 4 carbon atoms, $R_4'$ signifies a hydrogen atom, or an alkyl radical of 1 to 4 carbon atoms, or the phenyl radical, and $R_9'$ signifies an alkyl radical of 1 to 4 carbon atoms.

5. A compound of claim 1, in which each $R_2$ is hydrogen.

6. A compound of claim 1, in which Me signifies copper, zinc, nickel or cobalt.

7. A compound of claim 1, in which $R_3$ signifies hydrogen, unsubstituted alkyl of 1 to 4 carbon atoms, or unsubstituted phenyl.

8. A compound of claim 1, in which $R_3$ signifies hydrogen.

9. A compound of claim 1 of formula

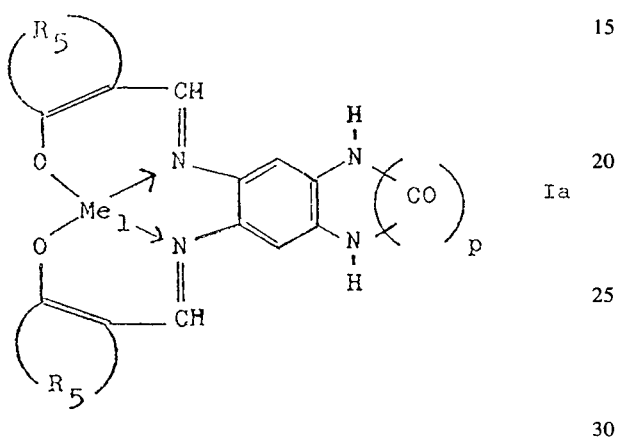

Ia in which $R_5$ signifies a radical of formula V,

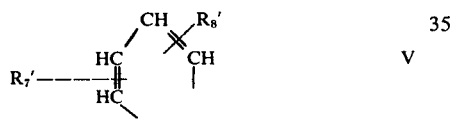

V in which $R_7'$ and $R_8'$, which may be the same or different, each signifies hydrogen, chlorine or methoxy, of formula VI,

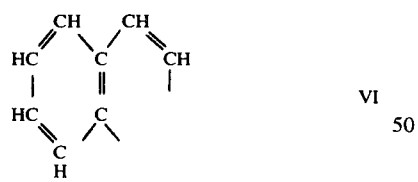

VI or of formula VII,

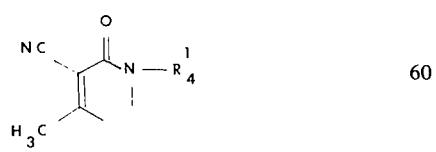

in which $R_4'$ is hydrogen, alkyl of 1 to 4 carbons or phenyl Me signifies nickel, cobalt, copper or zinc, and p signifies 1 or 2.

10. A compound of claim 9 of formula

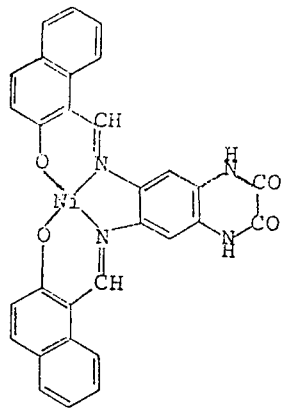

11. A compound of claim 9 of formula

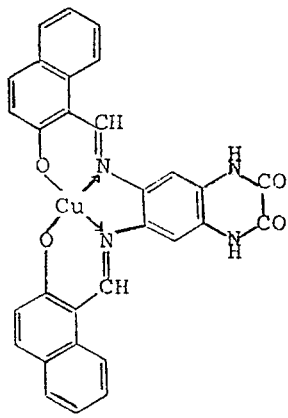

12. A compound of claim 9 of formula

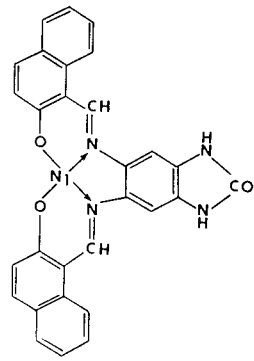

13. A compound of claim 9 of formula

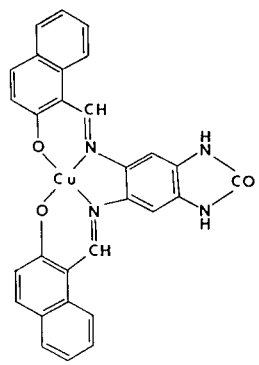

14. A compound of formula

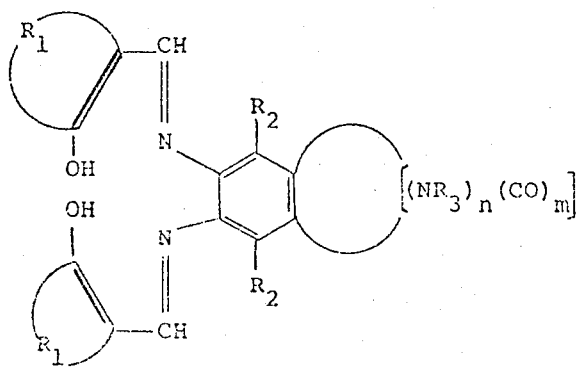

in which the radicals $R_1$, which may be the same or different, together with the carbon atoms to which they are attached, each signifies an unsubstituted or mono-, di-, tri- or tetra-substituted carbocyclic radical selected from the group consisting of 1,2-phenylene, 1,2-naphthalene and 2,3-naphthalene, or a heterocyclic radical of the formula

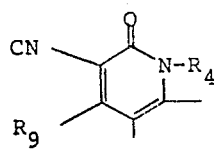

in which $R_4$ signifies hydrogen or an alkyl radical of 1 to 8 carbon atoms or a phenyl radical
and $R_9$ signifies an alkyl radical of 1 to 8 carbon atoms,
each $R_2$ is hydrogen, halogen or alkyl or alkoxy of 1 to 4 carbon atoms,
$>[(NR_3)_n(CO)_m]$ signifies a radical selected from

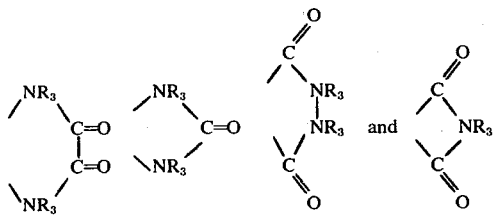

$R_3$ signifies hydrogen, an alkyl radical of 1 to 8 carbon atoms, which is unsubstituted or substituted by halogen, cyano, alkoxy of 1 to 8 carbon atoms, phenyl, phenoxy, acyl, acylamino or acyloxy, or a phenyl radical which is unsubstituted or mono-, di- or tri-substituted,
$m$ signifies 1 or 2,
and n signifies 1 or 2,
provided that the sum of $n$ and $m$ is at least 3 and that the compounds contain no carboxylic or sulphonic acid groups,
and further provided that any substituent on a carbocyclic significance of $R_1$ or on the phenyl significance of $R_3$ is selected from the group consisting of halogen, alkyl or alkoxy of 1 to 8 carbon atoms, trifluoromethyl, cyano, nitro, hydroxylamine, alkylamino or dialkyl-amino in which the alkyl radical(s) contain 1 to 8 carbon atoms, and acyl,
and further provided that any acyl radical is selected from the group consisting of alkoxycarbonyl and alkanoyl in which the alkyl radical contains 1 to 4 carbon atoms, alkylsulphonyl or alkoxysulphonyl of 1 to 4 carbon atoms, phenylsulphonyl, benzoyl, phenoxycarbonyl, phenoxysulphonyl and alkylaminocarbonyl and dialkylaminocarbonyl in which the alkyl radical(s) contain 1 to 4 carbon atoms.

15. A compound of claim 14 of formula

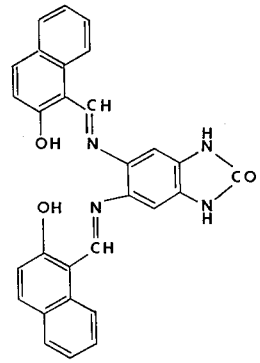

16. A compound of claim 14 of formula

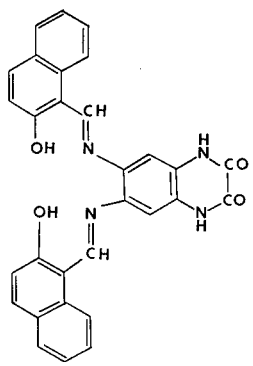

17. A compound according to claim 4 wherein the radicals $R_1$ are the same, $R_2$ is hydrogen, $R_3$ is hydrogen, alkyl of 1 to 4 carbons or phenyl, and the radical $>[(NR_3)_n(CO)_m]$ is

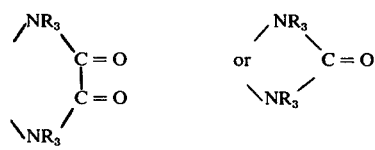

18. A compound according to claim 9 wherein $R_5$ is a radical of formula VI.

* * * * *